United States Patent Office 3,528,835
Patented Sept. 15, 1970

3,528,835
PREPARATION OF COLORED CERAMIC PIGMENTS BASED ON SYNTHETIC ZIRCON
Joseph Gascon, Thann, Haut-Rhin, France, assignor to Fabriques de Produits Chimiques de Thann et de Mulhouse, Thann, France, a corporation of France
No Drawing. Continuation-in-part of applications Ser. No. 524,996, Dec. 23, 1965, and Ser. No. 654,527, July 19, 1967. This application June 9, 1969, Ser. No. 831,781
Claims priority, application France, Dec. 28, 1964, 64; Great Britain, July 22, 1966, 33,101/66; June 10, 1968, 27,540/68
Int. Cl. C09c 1/00
U.S. Cl. 106—299
29 Claims

ABSTRACT OF THE DISCLOSURE

Synthetic zircon pigments for ceramics are prepared at reduced costs and with improved colorations by heating above 700° C., as in the range 800–900° C., an approximately equimolar mixture of sodium silicozirconate and zirconium sulfate in the presence of silica and of coloring and mineralizing agents, and washing and grinding the product. Sodium sulfate present in excess improves the mineralization. The mixture is calcined in the presence of a non-oxidizing or reducing atmosphere or of gaseous chlorine generated in situ. Its zircon-forming materials are prepared advantageously by reacting powdered sodium silicozirconate frit with an approximately equimolar amount of concentrated sulfuric acid; or by mixing together approximately equimolar quantities of such frit, a basic zirconium sulfate and free silica. Excellent blue pigments are produced when the mixture contains, based on weight contents of $ZrO_2+SiO_2$, 1.5 to 2.5% of a vanadium compound, e.g., ammonium metavanadate, and pink pigments when it contains 10 to 15% of an iron compound, e.g., $FeSO_4.7H_2O$, in the presence of a fluoride and of ammonium chloride or zirconium oxychloride for thermal reactions that yield chlorine via NaCl and $SO_3$.

---

This application is a continuation-in-part of copending U.S. applications, Ser. No. 524,996, filed Dec. 23, 1965, and Ser. No. 654,527, filed July 19, 1967.

The present invention relates to a process for the preparation of colored ceramic pigments having a base of synthetic zircon and, more particularly, to the preparation of blue vanadium-zircon pigments, pink (rose) iron-zircon pigments, or other mineral colors having coloring metal oxide fixed in the crystal lattice of a base of synthetic zircon.

Such pigments are used in ceramics and especially for the production of colored ceramic enamels, glazes and tiles and other ceramic coverings or facings for domestic and industrial uses.

It is known to prepare such blue mineral colors by calcining a mixture of zirconia ($ZrO_2$), silicia sodium fluoride and ammonium metavanadate. This known process, however, makes use of relatively costly materials, and it requires an excessive use of vanadium because it does not bring about a complete fixing of the vanadium in the effective vanadyl form in the lattice of the synthetic zircon (zirconium silicate).

Efforts have been made to increase the incorporation of the vanadium as vanadyl ion by the addition of alkaline halides to the fluoride utilized. Again, however, the retention of the vanadium still is not complete, as is recognized in French Pat. No. 1,281,508 which describes the above mentioned process with these variations.

Moreover, the quality of the starting zirconia has an important influence on the color tone obtained by the known processes. That influence is related to the action of impurities debasing the intensity of the blue coloration of the pigment. See the studies of Booth and Peel, Transaction of the VIIth International Ceramic Congress, published by the British Ceramic Society (London, 1960), pages 39–52, especially Table 3 at page 42. It has not been practicable to obtain a vanadium-zircon pigment having valuable blue tone qualities by the use of an impure zirconia.

The principal object of the present invention is to remedy the above mentioned shortcomings of known processes.

The invention provides a process which enables the production of synthetic zircon pigments, at considerably reduced costs for starting materials; also, the production of such pigments with improved color qualities. Further, distinctive new synthetic zircon pigments are provided.

According to the invention, a ceramic pigment base of synthetic zircon is prepared by calcining at a temperature about 700° C.—preferably in the range of 800° to 900° C., a mixture of a zirconium sulfate and an alkali metal silicozirconate, such as sodium silicozirconate

$(Na_2O.ZrO_2.SiO_2)$ in the presence of a mineralizing agent and of enough silica, whether combined or in free state, to form synthetic zircon ($ZrSiO_4$) with the zirconium contents of the materials.

At the same time, desired color can be imparted to the synthetic zircon by carrying out the calcination in the presence of a suitable zircon coloring agent, which may be a compound of any of the various metals known to be capable of entering as a coloring oxide into the crystal lattice of zircon. When a blue ceramic pigment is desired, one or more vanadium compounds is used as the coloring agent; when a pink, or rose, pigment is desired, one or more suitable compounds or iron is used.

The present invention makes use of the discovery that the reaction which occurs at elevated temperature between sodium silicozirconate and zirconium sulfate will produce reactive zirconia that readily forms a colored synthetic zircon in the course of its production, or of further heating, in the presence of a mineralizing agent and of sufficient amounts of silica and a zircon-coloring agent. This same reaction produces sodium sulfate in the mass, and instead of being detrimental, the presence of sodium sulfate appears to favor mineralization and colorization by contributing to the creation of a form of $ZrO_2$ having a beneficial physiochemical reactivity vis-a-vis the silica and the coloring agent. The reaction mass produced by the calcination yields the ceramic pigment upon being washed to remove the sodium sulfate present and suitably disintegrated as by grinding.

The process may be carried out effectively by the use of zirconium sulfate of any composition. Ordinarily, zirconium sulfate is provided in the reaction mixture in approximately equimolar proportion to the silicozirconate, so that this sulfate by thermal decomposition will liberate enough $SO_3$ for the reaction with the alkali metal oxide (usually $Na_2O$) content of the silicozirconate; and enough free silica also is provided in the mixture to react with the zirconium content of this sulfate. Thus, the overall effect of the zircon-forming reactions may be considered to be the formation of equimolar proportions of reactive zirconia and silica, which become mineralized as $ZrSiO_4$, in the presence of sodium sulfate formed simultaneously from the starting zirconium compounds.

According to another feature of the invention, it has been found that sodium sulfate provided in the starting mixture, additional to the sodium sulfate that will be formed by the reaction, assures a good mineralization of the synthetic zircon and a better development of the desired pigment color. Pursuant to this finding, the reaction mass may be provided with a total content of alkali metal sulfate such as $Na_2SO_4$, including the amount present at the outset of the heating and the amount formed by the reaction, equivalent to between 10 and 50% of its weight. A total content of such sulfate of the order of about one-third of the weight of the mass, or a starting content thereof in approximately equimolar relation to the amounts of the zirconium compounds and free silica contained in the mixture to be calcined, has appeared to be particularly beneficial.

A basic zirconium sulfate may be used to advantage in the preparation of the reaction mixture, such as one having the general formula $xZrO_2 \cdot ySO_3 \cdot nH_2O$, in which $x$, $y$ and $n$ are small whole numbers. A particularly effective form of basic zirconium sulfate is that which is described in French Pat. 1,375,076 and U.S. Pat. 3,445,199, which has approximately the composition $2(ZrO_2) \cdot SO_3 \cdot nH_2O$. This particular basic sulfate ordinarily contains about 1 to 2.5% by weight of fluorine, calcuated versus the $ZrO_2$ content as a result of having been precipitated in the presence of fluorine ions; so it inherently provides in the reaction mixture a fluorine compound which will cause the formation of $SiF_4$ in situ in the course of the calcination, thus serving as a mineralizing agent for the formation of synthetic zircon.

It is preferred in other cases too that the reaction mixture be provided with a fluorine compound to aid in the mineralization. This may be done by including in the mixture any fluorine compound that will form $SiF_4$ by reaction in the course of the heating with free silica or with $SO_3$ generated in the calcining mass. Among suitable compounds are the alkali metal fluorides and fluosilicates, e.g., $Na_2SiF_6$. Even when the zirconium sulfate used contains fluorine, it is generally desirable, though not essential, to provide an additional source of fluorine in the mixture to be calcined.

It has further been discovered that the zircon forming materials of the reaction mixture according to the invention, along with a beneficial starting content of alkali metal sulfate, can be provided to advantage by resort to an alkali metal silicozirconate, such as a finely divided frit of $Na_2O \cdot SiO_2 \cdot ZrO_2$, as their principal source. Such a frit can be decomposed by sulfuric acid so as to provide a solid mixture of zirconium sulfate, silica and sodium sulfate, which, when suitably ground and in the presence of a sufficient excess or added quantity of such frit will give a mixture remarkably effective for the practice of the present invention.

In this way, the costs of reaction materials can be further reduced, yet excellently colored zircon pigments are obtained.

When the principal materials of the mixture to be calcined are provided in this way, the overall reactions leading to the formation of the synthetic zircon involve two stages. In the first stage, approximately equimolar proportions of the frit and sulfuric acid may be considered to react according to the equation:

(1) 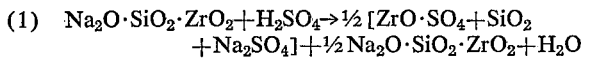

In the calcination stage, the approximately equimolar mixture of products of the acid reaction and frit is considered to react as follows:

(2) 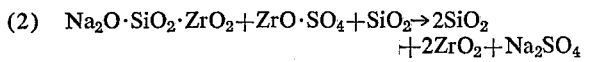

with the consequent formation of $ZrSiO_4$ in the presence of an approximately equimolar quantity of sodium sulfate.

When a reaction of frit and sulfuric acid is so utilized, the acid is preferably added in concentrated form, e.g., as 98% $H_2SO_4$, to slightly moist, powdered alkali metal silicozirconate. The resulting mass may be aged and dried for a period of days and then finely ground. If desired, a part only of the alkali metal silicozirconate may be present in the first stage, the remainder being added, with such other desired reaction components as are not initially present, after the sulfuric acid has reacted.

The silicozirconate to be used either for reaction with acid or for direct admixture with a zirconium sulfate and free silica may be a product of the calcination of natural zircon or zirconium silicate at 850–950° C. in the presence of an equimolar amount or a slight excess (about 2–5% excess) of alkali metal carbonate—such, for example, as a frit prepared according to the method described in French Pat. No. 917,317.

With regard to the conduct of the calcination of the zircon forming mixture, it has been found that the exclusion of atmospheric oxygen from the reaction mixture, such as by heating it in an inert or a reducing atmosphere, will contribute importantly to the effectiveness of the process and especially to the fixation of the coloring agent in the zircon lattice. In the preparation of the blue vanadium-zircon, this is believed to assist in fixation of the vanadium in vanadyl (VO++) form.

In the presence of small quantities of vanadium and in an atmosphere free of oxygen, the synthesis and the blue coloration of the zircon appear to take place principally in the temperature range between 750 and 830° C. Generally speaking, thermal decomposition of the zirconium sulfate, carrying along that of the silicozirconate, begins at a temperature above 650° C., as in the neighborhood of 700° C., and proceeds until the temperature reaches 800–830° C. As the decompositions proceed with elevation of the temperature, the reactions for the synthesis of zircon and the retention of vanadium become active in the neighborhood of 750–800° C. All the conditions of reactivity between $SiO_2$, $ZrO_2$ and the vanadyl ion VO++ are then favorable to a synthesis of zircon with good fixation of the vanadyl ion. The conduct of the reaction under a cover excluding atmospheric oxygen or in a reducing atmosphere is believed effective to avoid oxidation of the vanadium to the pentavalent state during the development of the coloration between 750 and 830° C.

To this end, the reaction mixture can be calcined in a graphite container, for example, so that products of combustion of the graphite will form a slightly reducing atmosphere over the mixture. The blue tint develops particularly favorably in a furnace atmosphere containing carbon monoxide, which is highly reducing to the vanadium present. Yet the blue pigment will also be obtained by placing the reaction mixture in the graphite container inside a furnace traversed by an inert atmosphere such as a stream of nitrogen or of carbon dioxide.

According to a further feature of the invention, it has been discovered that a mineralization reaction with exceptionally good coloration of the zircon can be obtained, and without need for the use of either a closed reaction container or a controlled furnace atmosphere, by carrying out the calcination of the reaction mixture in the presence of gaseous chlorine generated in situ.

The gaseous chlorine may be so generated by providing in the reaction mixture an alkali metal chloride, e.g. sodium chloride, which will produce chlorine by reaction with $SO_3$ formed by decomposition of the zirconium sulfate at a temperature in the neighborhood ogf 700° C. Thus, $2NaCl + 2SO_3 \rightarrow Cl_2 + SO_2 + Na_2SO_4$. While the alkali metal chloride required for this reaction might be added as such to the reaction mixture, it is much more effective to form it in situ by including in the mixture at the outset of the heating a suitable thermally unstable chlorine compound, such as ammonium chloride or zirconium oxychloride, that will decompose to form hydrogen chloride as the mixture is heated. The hydrogen chloride then reacts with the alkali metal silicozirconate or with a reaction product thereof to give the alkali metal chloride.

The production of synthetic zircon pigments can be carried out with great effectiveness according to this feature of the invention, as by providing in the reaction mixture at the outset of the heating ammonium chloride in an amount such that 3 to 6% of gaseous chlorine, based on the combined weights of the $ZrO_2$ and $SiO_2$ contents of the mixture, will be generated in situ during the calcination. In such a practice, the starting mixture is preferably made to contain an excess of alkali metal silicozirconate in approximately 1:2 molar ratio to the ammonium chloride content, for reaction with the hydrogen chloride which is formed by decomposition of the ammonium chloride as the mixture reaches a temperature near 400° C. This excess thus will have been reacted when the heating brings the mixture to the calcination temperature above 700° C.

The performance of the present process has also been found to be favorably affected by providing enough zirconium sulfate in the reaction mixture to give a limited excess of $SO_3$ during the calcination. It is advantageous to provide for the generation of $SO_3$ in an amount approximately 10% greater than that which is stoichiometric to the amount of unreacted frit present. The amount of excess $SO_3$, however, should not exceed 15%.

The reactions may also be influenced favorably by heating the reaction mixture rapidly to the calcination temperature, such as at the rate of about 160 to 180° C. per hour.

According to the present invention, the amount of vanadium required for intense blue coloration of the synthetic zircon is less than 4.5% (expressed as $V_2O_5$) and ordinarily does not exceed 1.5 to 2.5% based on the combined weights of zirconium (expressed as $ZrO_2$) and silicon (expressed as $SiO_2$) contained in the reaction materials. The amount of iron compound required for good pink coloration generally is above 10% (expressed as $Fe_2O_3$) and preferably is between 10 and 15% of such combined weights. A higher content of the coloring agent, e.g., one corresponding to 4.3% of $V_2O_5$, tends to attenuate the coloration. The economy of the present process in respect of vanadium is evident, for in previously known processes the vanadium requirement is considerably greater, being of the order of 4.8% of $V_2O_5$.

While suitable compounds of the coloring metals include their oxides, hydroxide, halides, sulfates, and salts having the metal present in the anion, a convenient source of vanadium is ammonium metavandate, or vanadyl chloride, and a convenient source of iron is ferrous sulfate, which may be used in the form of the heptahydrate.

The following detailed examples further illustrate the practice of the invention.

EXAMPLE 1

A blue vanadium-zircon pigment having a good color intensity and excellently suited for use in ceramic glazes is produced as follows:

Use is made of a laboratory muffle furnace able to hold one or several graphite or preferably silicoaluminous refractory containers and eventually traversed by a stream of inert gas.

The starting mixture is made up of:

(a) a dried and ground basic zirconium sulfate containing 58% of $ZrO_2$, prepared according to French Pat. 1,375,076;
(b) a washed and dried frit of sodium silicozirconate having the analysis: $ZrO_2$, 49.5%; $SiO_2$, 24.8%; $Na_2O$, 24.2%; zircon, 1.2%;
(c) ammonium metavanadate of laboratory grade, as the coloring agent; and
(d) very finely ground quartz ($SiO_2$).

At the outset an intimate mixture of the starting materials is prepared by the use of:

100 grams of the basic sulfate,
54 grams of the sodium silicozirconate frit,
28 grams of quartz, and
4 grams of ammonium metavanadate.

This mixture is placed in a graphite or refractory container which in turn is placed in the furnace and heated to 800° C. A stream of nitrogen is eventually passed to the interior of the muffle and its temperature is raised to 830° C. and held there for 1 to 1½ hours. The colored reaction mass then is allowed to cool, and then is washed with water to remove sodium sulfate.

The washed reaction mass is suspended in 1,500 cc. of water under vigorous agitation, and after decantation and elimination of the aqueous phase, another washing with water is effected. The mass is subsequently filtered on a Buchner filter and then ground with porcelain balls in a mill containing a small quantity of water. After 12 hours of grinding, the product is obtained with a fineness corresponding to a specific surface value in the neighborhood of 10,000 cm.$^2$/g., as determined by a Blaine permeabilimeter. The product is a very blue pigment. This pigment is again recovered by filtration and then oven dried at between 100 and 110° C. It is then ready to be utilized in glazes or other ceramic compositions.

EXAMPLE 2

Several refractory crucibles containing the following mixtures are placed inside laboratory muffle furnace heated to 800° C. and subjected to a reducing atmosphere prepared by the combustion of petroleum coke:

Mixture A 20 g. dried and ground basic zirconium sulfate containing 58% of $ZrO_2$ (as in Example 1),
10.8 g. sodium silicozirconate frit,
5.6 g. micronized silica, and
0.9 g. ammonium metavanadate.

Mixtures B, C and D

Mixture A is remade in three batches with respective additions of 4.8 g., 5.6 g. and 6.4 g. of ground anhydrous sodium sulfate. The resulting mixtures B, C and D, respectively, contain after calcination 30%, 32% and 33% by weight of $Na_2SO_4$, including the initial $Na_2SO_4$ and the $Na_2SO_4$ formed in the course of the reaction.

The calcination is carried out at 830° C. for about 1½ hours. After cooling, it can be determined by visual observation that there is a progressive intensification of the blue color from mixture A to mixture C. By visual observation the tone qualities in mixture C and D appear identical. The intensities of the several colors are maintained after application of the pigments in baked ceramic coatings or enamels on earthenware tile.

The pigments taken from the furnace are washed with water and ground in a ball mill. The fineness attained corresponds to a Blaine permeability of the order of 10,000 cm.$^2$/g. After filtration and drying, each product is incorporated to an amount of 10% in an enamel frit of the following composition:

| | Percent |
|---|---|
| Feldspar (orthoclase) | 39.0 |
| English kaolin | 5.0 |
| Ground quartz | 26.0 |
| $CaCO_3$ | 5.0 |
| ZnO | 7.1 |
| $BaCO_3$ | 0.5 |
| Sodium silicozirconate | 16.3 |

The resulting composition is fired at a temperature of 1120° C.

The color intensity of each tile coating was verified by means of a "Color Eye" instrument, Model D, of Instrument Development Laboratories, Inc., utilized as a spectrophotometer. This apparatus gives values of reflection in percentages for wavelengths determined in millimicrons (Angstrom units) and thus enable the spectrophotometric curve of each sample to be traced.

Generally speaking, the intensity of the blue color obtained according to the example varied with the sodium sulfate content of the reaction mixture. The most desirable color quality was attained when the $Na_2SO_4$ content was of the order of 33%.

EXAMPLE 3

Finely divided materials were prepared for this example as follows:

(a) A basic zirconium sulfate prepared according to French Pat. No. 1,375,076 was dried, ground lightly and screened through a T65 screen of the Tyler series. The screened material contained 60% of $ZrO_2$.

(b) A frit of sodium silicozirconate was screened through the T65 screen.

(c) An industrial grade of sodium sulfate containing 93% of $Na_2SO_4$ was screened in the same manner, for use of the grains passing through the T65 screen.

The following were introduced into a rotary powder mixer:

970 g. of the basic zirconium sulfate,
540 g. of the sodium slicozirconate frit,
280 g. of micronized silica,
340 g. of the sodium sulfate,
45 g. of ammonium metavanadate, and
50 g. of ammonium chloride.

After 30 to 40 minutes of mixing, the mixture was placed in a covered reaction container and heated in an electric muffle furnace to 830° C., this temperature being maintained for 1½ hours. After cooling, the reaction mass was washed twice with water, ground in a ball mill and then filtered.

A pigment having a beautiful blue shade was obtained.

EXAMPLE 4

A powdered mixture of the following materials was prepared in a powder mixer:

510 kg. of basic zirconium sulphate containing 60% by weight of $ZrO_2$, obtained by the process of French Pat. No. 1,375,076.
423 kg. of sodium silicozirconate analysing 98% $Na_2O.ZrO_2.SiO_2$.
150 kg. of micronised quartz of particle size at most 10 microns.
51 kg. of ammonium chloride.
25 kg. of ammonium metavanadate.
172 kg. of sodium sulfate.

The powdered mixture was calcined in a closed sagger at a temperature rising to 870° C. The product was washed, ground, filtered and dried.

The blue pigment obtained was not attacked by concentrated acids, alkaline solutions, or molten potassium bisulphate, but it could be decomposed by alkaline fusion, as can natural zircon. It was stable at high temperature and suitable for use in enamels. It contained about 1.1% by weight of vanadium fixed in the zircon lattice, this vanadium being insoluble in sulfuric acid.

EXAMPLE 5

111 kg. of sodium silicozirconate, 3.6 kg. of sodium fluosilicate and 20 litres of water were thoroughly mixed in a "Werner" mixer, and then 43.2 kg. of 98% sulphuric acid was slowly added while mixing was continued. After being dried the product weighed 149 kg.; it was ground, and then mixed in a powder mixer with 5.6 kg. of ammonium chloride and 2.6 kg. of ammonium metavanadate. On calcining the resulting mixture an intensely blue pigment was obtained.

When ferrous sulphate is employed to give a pink pigment, a similar procedure is used, though the amount of sodium silicozirconate is adjusted to take account of the $SO_3$ content of the ferrous sulphate. The amount of the iron compound is preferably at least 10%, especially 10–15%, reckoned as $Fe_2O_3$.

EXAMPLE 6

The following were mixed intimately in a Werner-type mixer:

40.5 kg. of basic zirconium sulphate containing by weight 62% of $ZrO_2$ and 1.6% of fluorine, obtained by the process of French Pat. No. 1,375,076.
70.5 kg. of sodium silicozirconate, analysing 98% of $Na_2O.SiO_2.ZrO_2$.
14.7 kg. of micronised quartz as in Example 1.
41.7 kg. of ferrous sulphate heptahydrate, 98% pure.

To the mixture was added, while mixing was continued, 17.7 litres of a solution of zirconium oxychloride, analysing 210 g./liter of HCl and 252 g./liter of $ZrO_2$. The mixture was rendered homogeneous, dried, and ground in a ball mill. It was then calcined in a closed sagger at a temperature rising to 870° C. The product was again washed, ground, filtered, and dried.

A brown product was obtained, in which part of the iron was in the form of free iron oxide which could be dissolved in hydrochloric acid. The pigment, freed from such iron oxide, gave a pink color to enamels.

EXAMPLE 7

To a Werner-type mixer containing 52 kg. of sodium silicozirconate moistened with 10 litres of water was added, while mixing, 7.3 kg. of 98% sulphuric acid. The product, after being dried, weighed 69 kg. It was ground, and then again introduced into the Werner mixer and mixed with 49.3 kg. of sodium silicozirconate, 45 kg. of ferrous sulphate heptahydrate, 4.5 kg. of ammonium chloride, 1.7 kg. of sodium fluosilicate, and 8 litres of water. The product was dried and ground in a ball mill, and then calcined, washed, ground, filtered and dried as in Example 6. An equally good pink pigment was obtained.

EXAMPLE 8

1,110 g. of sodium silicozirconate frit was moistened with 200 cc. of water in a 5 liter "Sevin" mixer and 240 cc. of concentrated sulphuric acid (98% $H_2SO_4$) was then poured in slowly. Near the end of the reaction 36 g. of sodium fluorosilicate was also incorporated. The resulting mass was left to stand for 8 days and then pulverised in a "Forplex" laboratory grinder. About 1600 g. of a mixture of zirconium sulphate, sodium sulphate, free silica and sodium silicozirconate was recovered.

This material was mixed in a Netzsch powder mixer with 56 g. of ammonium chloride and 26 g. of ammonium metavanadate. The mixture was then placed in an uncovered gazette and heated in a muffle furnace, the temperature being increased at the rate of about 170° C./hour up to 860° C., and was maintained at this temperature for 2 hours. After cooling the calcined product was washed with water until free from water soluble alkali metal salts. The product was then ground, filtered and dried to give a blue pigment suitable for use in enamels.

This pigment resists attack by concentrated acid, alkaline solutions and potassium bisulphate. It is decomposed only by alkaline fusion, entirely as natural zircon. The content of fixed vanadium in the synthetic zirconium, which is insoluble in concentrated sulphuric acid, is 1.1% by weight; the content of free vanadium is 0.02–0.03%.

This pigment was incorporated into an enamel composition containing 15% by weight of pigment and the intensity of color was measured spectrophotometrically and compared with the intensity of color observed in a control enamel using the same amount of a commercial blue zircon pigment known as the Bayer "V 999" pigment. The following reflectivities were measured:

| Wavelength | Percent reflectivity | |
|---|---|---|
| | Enamel with Example 8 pigment | Control enamel |
| 460 mu | 35.6 | 48 |
| 640 mu | 6 | 10.3 |

These figures indicate the much greater intensity of color obtained with the new pigment product.

The process of the present invention differs fundamentally from previously known processes in that it brings about the direct synthesis of zircon, or zirconium silicate, from sodium silicozirconate and zirconium sulfate. These starting materials are much less costly than the final products utilized in other processes such as those making use of pure zirconia as a starting material.

The process has a fundamental advantage which has not been predictable, in that in the presence of a large amount of sodium sulfate the fixation of the coloring agent is brought about easily and a better development of the desired coloration is attained.

There is another important advantage in that a smaller quantity of vanadium is required in order to obtain comparable or even superior intensities of blue coloration in the product.

Moreover, in the process of the invention the transformation of the zirconia is achieved in a simple and advantageous manner. The reactive zirconia formed is not subject to the deleterious influence of the usual impurities of $ZrO_2$, and this is a further advantage over other processes.

The foregoing description and examples have set forth numerous particulars to illustrate the principles and practices of the invention, but it is to be understood that variations, substitutions and omissions may be made without departing from the spirit or the scope of the invention which is intended to be defined by the appended claims.

What is claimed is:

1. A process for the preparation of ceramic pigments which comprises calcining a mixture of an alkali metal silicozirconate and a zirconium sulfate in the presence of a mineralizing agent and of sufficient amounts of silica and a zircon-coloring agent and at a temperature sufficiently elevated above 700° C. to convert the zirconium contents of the materials into a colored synthetic zircon.

2. A process according to claim 1, and excluding atmospheric oxygen from said mixture during the calcination.

3. A process according to claim 1, said mixture being held under a reducing carbon monoxide atmosphere, or in a refractory container and eventually under an inert or a reducing atmosphere, during the calcination.

4. A process according to claim 1, and intimately contacting the reaction mixture with a reducing gas in the course of the calcination.

5. A process according to claim 1, and generating gaseous chlorine in the reaction mixture in the course of the calcination.

6. A process according to claim 5, the chlorine being formed from alkali metal chloride provided in said mixture for reaction with $SO_3$ generated by decomposition of the zirconium sulfate.

7. A process according to claim 6, said mixture containing at the outset of the heating a chlorine compound that will thermally decompose to form hydrogen chloride whereby said alkali metal chloride is formed in situ.

8. A process according to claim 6, said mixture containing at the outset of the heating ammonium chloride in an amount such that 3 to 6% of gaseous chlorine, based on the combined weights of the $ZrO_2$ and $SiO_2$ contents of the mixture, will be generated in situ during the calcination.

9. A process according to claim 1, said mixture also containing alkali metal sulfate from the outset of the heating.

10. A process according to claim 1, said mixture also containing from the outset of the heating alkali metal sulfate in an amount such that the calcined mass will contain between 10 and 50% by weight of alkali metal sulfate.

11. A process according to claim 1, said silicozirconate being sodium silicozirconate ($Na_2O.SiO_2.ZrO_2$) and said mixture also containing from the outset of the heating sodium sulfate in an amount such that the calcined mass will contain of the order of 33% by weight of $Na_2SO_4$.

12. A process according to claim 1, said zirconium sulfate being a basic zirconium sulfate.

13. A process according to claim 1, said zirconium sulfate being a basic zirconium sulfate having the approximate formula $2(ZrO_2).SO_3.nH_2O$.

14. A process according to claim 1, said zirconium sulfate being a basic zirconium sulfate containing about 1 to 2.5% by weight of fluorine calculated versus the $ZrO_2$ content.

15. A process according to claim 1, said mineralizing agent comprising a fluorine compound and said coloring agent comprising a compound of vanadium.

16. A process according to claim 1, said mixture containing approximately equimolar proportions of sodium silicozirconate ($Na_2O.SiO_2.ZrO_2$) and zirconium sulfate with sodium sulfate and with enough free silica to react with the zirconium content of said zirconium sulfate.

17. A process according to claim 16, the zirconium sulfate, silica and sodium sulfate in said mixture being the reaction products of the decomposition of sodium silicozirconate ($Na_2O.SiO_2.ZrO_2$) by concentrated sulfuric acid.

18. A process according to claim 1, the zirconium sulfate content of said mixture being sufficient to generate an amount of $SO_3$ about 10% to 15% in excess of that which is stoichiometric to the alkali metal content of said silicozirconate.

19. A process for the preparation of ceramic pigments which comprises heating to the temperature between 800° C. and 900° C. a mixture of approximately equimolar proportions of sodium silicozirconate ($Na_2O.ZrO_2.SiO_2$) and a zirconium sulfate with enough free silica to form zircon with the zirconium content of said sulfate, said mixture also containing at the outset of the heating sodium sulfate, a fluorine compound, a zircon-coloring agent, and ammonium chloride in an amount such that 3 to 6% of gaseous chlorine, based on the combined weights of the $ZrO_2$ and $SiO_2$ contents of the mixture, will be generated in situ during the heating; continuing the heating at said temperature until the materials are converted into a mixture of a colored synthetic zircon and sodium sulfate; and thereafter washing sodium sulfate from and grinding the reaction mass.

20. A process according to claim 19, said coloring agent being a vanadyl compound in an amount, computed as $V_2O_5$, equivalent to about 1 to 2.5% of said combined weights, or a ferrous compound in an amount, computed as $Fe_2O_3$, equivalent to about 10 to 15% of said combined weights.

21. A process according to claim 19, said zirconium sulfate being a basic zirconium sulfate having the approximate formula $2(ZrO_2).SO_3.nH_2O$ and containing about 1 to 2.5% by weight of fluorine calculated versus the $ZrO_2$ content.

22. A process according to claim 19, the zirconium sulfate, silica and sodium sulfate in said mixture being the reaction products of the decomposition of sodium silicozirconate ($Na_2O.SiO_2.ZrO_2$) by concentrated sulfuric acid.

23. A process according to claim 19, said mixture being prepared by reacting moist finely divided sodium silicozirconate ($Na_2O.SiO_2.ZrO_2$) with an approximately equimolar quantity of concentrated sulfuric acid, aging and then grinding the acid-reacted mass, and adding thereto a fluorine compound, a zircon-coloring agent and said ammonium chloride.

24. A process according to claim 23, said fluorine compound being added before the aging and said coloring agent and said ammonium chloride being added to the ground acid-reacted mass.

25. A process according to claim 19, said mixture containing a sufficient amount of said silicozirconate to react with said chlorine generated in situ.

26. A process according to claim 19, and heating to said temperature being effected at a rate of about 160° to 180° C. per hour.

27. A ceramic pigment having a base of a synthetic zircon which is a calcination product of a mixture of an alkali metal silicozirconate, a zirconium sulfate and silica.

28. A synthetic blue vanadium-zircon pigment which is a calcination product of a mixture of sodium silicozirconate, a zirconium sulfate, silica and a vanadyl vanadium compound.

29. A fired ceramic coating or glaze containing a synthetic blue vanadium-zircon pigment according to claim 28.

References Cited

UNITED STATES PATENTS

| | | | |
|---|---|---|---|
| 2,875,086 | 2/1959 | Weyl | 106—299 |
| 3,011,901 | 12/1961 | Traub et al. | 106—299 |
| 3,025,178 | 3/1962 | Seabright | 106—299 |
| 3,300,414 | 1/1967 | Meyer-Simon et al. | 106—299 X |

HELEN M. McCARTHY, Primary Examiner

W. F. W. BELLAMY, Assistant Examiner

U.S. Cl. X.R.

106—48